(12) United States Patent
Petrov et al.

(10) Patent No.: US 7,844,255 B2
(45) Date of Patent: Nov. 30, 2010

(54) SECURE PIN ENTRY DEVICE FOR MOBILE PHONES

(75) Inventors: Andrew Petrov, Princeton, NJ (US); Scott Goldthwaite, Hingham, MA (US); William W. Graylin, Saugus, MA (US)

(73) Assignee: VeriFone, Inc., San Jose, CA (US)

( * ) Notice: Subject to any disclaimer, the term of this patent is extended or adjusted under 35 U.S.C. 154(b) by 1330 days.

(21) Appl. No.: 11/296,555

(22) Filed: Dec. 7, 2005

(65) Prior Publication Data

US 2006/0122902 A1 Jun. 8, 2006

Related U.S. Application Data

(63) Continuation-in-part of application No. 11/226,823, filed on Sep. 14, 2005.

(60) Provisional application No. 60/634,399, filed on Dec. 8, 2004.

(51) Int. Cl.
 *H04M 1/66* (2006.01)

(52) U.S. Cl. .................. 455/411; 455/410; 455/415; 455/425; 455/566; 455/550.1

(58) Field of Classification Search ............ 455/411, 455/410, 415, 425, 566, 550.1
See application file for complete search history.

(56) References Cited

U.S. PATENT DOCUMENTS

| | | | |
|---|---|---|---|
| 5,940,511 A * | 8/1999 | Wilfong | 713/183 |
| 6,549,194 B1 * | 4/2003 | McIntyre et al. | 345/173 |
| 6,947,727 B1 | 9/2005 | Brynielsson | |
| 2002/0060246 A1 | 5/2002 | Gobburu et al. | |
| 2002/0166055 A1 * | 11/2002 | Challener et al. | 713/193 |
| 2003/0088794 A1 * | 5/2003 | Agam et al. | 713/202 |
| 2003/0172090 A1 | 9/2003 | Asunmaa et al. | |
| 2003/0236872 A1 | 12/2003 | Atkinson | |
| 2004/0030601 A1 | 2/2004 | Pond et al. | |
| 2004/0087339 A1 | 5/2004 | Goldthwaite et al. | |
| 2004/0152442 A1 * | 8/2004 | Taisto et al. | 455/406 |
| 2005/0085226 A1 | 4/2005 | Zalewski et al. | |
| 2005/0187873 A1 | 8/2005 | Labrou et al. | |
| 2005/0250538 A1 * | 11/2005 | Narasimhan et al. | 455/558 |
| 2006/0064391 A1 * | 3/2006 | Petrov et al. | 705/65 |
| 2006/0068897 A1 * | 3/2006 | Sanford et al. | 463/25 |

* cited by examiner

*Primary Examiner*—Joseph H Feild
*Assistant Examiner*—Huy D Nguyen
(74) *Attorney, Agent, or Firm*—Kolisch Hartwell, P.C.

(57) ABSTRACT

A secure mobile phone-point of sale (POS) system includes a mobile phone integrated with a secure PED module. The secure PED module is integrated with the mobile phone via the phone's serial port or directly to the phone's Printed Circuit Board Assembly (PCBA). The secure PED module conforms to security standards imposed by the payment card industry. The secure mobile phone-POS system has the functionality of both the secure PED and the mobile phone and the look and feel of the mobile phone.

34 Claims, 9 Drawing Sheets

SECURE PIN ENTRY DEVICE FOR MOBILE PHONES

CROSS REFERENCE TO RELATED CO-PENDING APPLICATIONS

This application claims the benefit of U.S. provisional application Ser. No. 60/634,399 filed on Dec. 8, 2004 and entitled SECURE PIN ENTRY DEVICE FOR MOBILE PHONES, which is commonly assigned and the contents of which are expressly incorporated herein by reference.

This application is also a continuation in part and claims the benefit of U.S. patent application Ser. No. 11/226,823, filed on Sep. 14, 2005, and entitled "SYSTEM AND METHOD FOR A SECURE TRANSACTION MODULE" the contents of which are expressly incorporated herein by reference.

FIELD OF THE INVENTION

The present invention relates to a secure Personal Identification Number (PIN) Entry Device (PED) and more particularly to a secure PED device that is integrated with mobile phone devices.

BACKGROUND OF THE INVENTION

Secure PEDs are used in connection with Point of Sale (POS) devices, ATMS, or computers for performing secure PIN entry requiring electronic transactions. These transactions are typically payment transactions or secure information exchange. The function of the PEDs is to prevent third parties from tampering with the above mentioned transaction devices in an attempt to steal the PIN from consumers who use them. PEDs must go through a certification process administered by local or global certification authorities. In order for the PEDs to pass the certification process they must meet certain security standards including secure storage of public/private keys provided from acquiring banks and processors for encryption and authentication. The PEDs must also have the ability to deter tampering with the device, i.e., be "Tamper Resistant", "Tamper Evident", and "Tamper Responsive". A device is "Tamper Resistant" if it prevents easy access to the PED and does not allow third parties to intercept the key strokes and steal the customer's PINs. A device is "Tamper Evident" if it becomes very apparent to the user when the device has been tampered with. A device is "Tamper Responsive" if in case someone attempts to tamper with the PED, the secure data of the PED that are used for the transactions get automatically erased from the memory thereby making the device useless for secure transactions. In one example, the certification requirements for the PEDs are described in the Payment Card Industry (PCI) PED specification, published on the Visa International website http://international.visa.com/fb/vendors/pin/reference.jsp. A secure PED must be certified by the appropriate authorities approved by Visa and MasterCard and once it has passed certification according to specifications and test, the device name is published as "certified." A secure PED may be a stand-alone device or it may be integrated with the transaction device, as is the case for POS and ATM. However, most PEDs have a rectangular, box-like form and are usually large compared to typical mobile phone devices.

A mobile phone device is defined by its functionality and "form factor". The main function of a mobile phone is to make phone calls in a mobile environment. Accordingly, a mobile phone or phone module includes hardware and software components that provide voice and data functionality over a wireless network. Today there are simple low cost mobile phones that perform just phone calls. There are also more expensive mobile phones that come with different ancillary features like digital cameras, PDA features, SMS, MMS, music, games, email, video streaming, among others. However, the core function of a mobile phone is simply its ability to make phone calls and if this function is removed the device is not a mobile phone anymore. Conversely if there is phone capability and any of the other ancillary features are removed, the device would still be a mobile phone. However, having the ability to make a phone calls in mobile environments alone does not make a device a "mobile phone".

Another important characteristic that defines a mobile phone is its "form factor", i.e., the look and feel of the device. Mobile phones come in several different physical styles or "form factors". While manufacturers are continually coming up with new types of designs, there are several common categories used to describe form factors of mobile phones:

i) Bar: (candy-bar or block) This is the most basic style. The entire phone is one solid monolith, with no moving parts aside from the buttons and possibly antenna.

ii) Clamshell: (folder) This type of phone consists of two halves, connected by a hinge. The phone folds closed when not in use. The top half usually contains the speaker, and the display or battery, with the bottom half containing the keypad and remaining components Most clamshell phones have a feature called Active Flip, which means that calls can be answered and ended by simply opening and closing the phone.

iii) Flip: This type of phone is a cross between the Bar and Clamshell types. Most of the components of the phone are in one part, but a thin "flip" part covers the keypad and/or display when not in use. The flip may be all plastic, or it may contain one or two minor components such as a speaker or secondary keys. Most flip phones also feature Active Flip, as described above.

iv) Slide: This type is usually designed similarly to a clamshell, with a large main display and speaker in one half, and the keypad and battery in the other half. But the two halves slide open instead of using a hinge. Slide designs allow the main display to be seen when closed, and are generally easier to open and close one-handed.

All these mobile phone designs are recognized as mobile phones and have the following common features. They are small enough so as to fit in a person's hand. Typical dimensions are in the range of 2-8 inches length and 1.5-3 inches width. They have a shape such that one can put the mobile phone up to his ear to listen and at the same time close to his mouth to talk. They have low weight. The weight is in the range of 4-9 ounces. If the device is larger or smaller it acquires another recognizable form factor. For example, a PC or a laptop can perform mobile phone functions when one plugs a radio module into it, but it still has the form factor of a PC or a laptop. The same is true with Tablet PC, or even a POS device that can perform mobile phone functions like a Lipman8000 mobile POS which can also dial a phone call, nonetheless it is still has a POS form factor and not a mobile phone form factor. Today's convergence of PDAs and mobile phones is still considered by the general public as having the form factor of a mobile phone because of size, shape and weight. These PDA-mobile phone devices are sized to fit into one's hand and one can hold them up close to his ears to listen and at the same time close to his mouth to talk in a way similar to how the average person would consider using a mobile phone. A larger size or a smaller size than that would start turning the mobile phone into a different form factor. For example one day when mobile phone capabilities are inserted into a wristwatch, that form factor will no longer be a mobile phone form factor, but it would be the form factor of a wristwatch. Thus form factor is important for defining a mobile phone.

Mobile phones have been combined with card readers to provide a new range of POS type terminals for conducting financial services transactions. While there are several card readers available today for mobile phones, offered by Semtek, Symbol, Apriva, none of these devices meet the PED security certification requirements. Most of these prior art devices are focused on the credit card market and are not designed for conducting debit card transaction where PIN entry is required. The keypads on the mobile phones are not secure and have not been approved or certified by major financial institutions. Accordingly, the current mobile phone-card reader combination devices do not meet the security requirements and cannot be certified for PIN entry requiring transactions.

Prior art POS devices with a certified PED have used a phone as an external modem for providing communications, similar to the way personal computers use a phone as an external modem for providing communications. However this is not a certified PED "integrated" with the phone as one device, but rather a POS that links to a phone. All these prior art POS devices function as standalone POS that link to other communication mediums, such as cable modems, DSL modems, or other dialup terminals, independent of the phone and thus are not considered to be an integrated unit with the phone. Furthermore, these devices do not have the form factor of a mobile phone. There are also prior art POS with a certified PED that use a wireless modem. However, these are wireless POS devices, and not a wireless mobile phone-POS with an "integrated" secure PED. Also, these devices do not have the form factor of a mobile device. Some of the wireless POS allow one to plug a separate microphone headset to dial a phone call, but it is still a POS and has the form factor of a POS and one would not consider it a mobile phone.

Accordingly, there is a need for a secure PED module that is certified by the various financial institutions and can be integrated with a mobile phone as one device to provide the small and convenient form factor and functionality of a mobile phone, while having the capabilities of a secure PED to enable POS various payment transactions including debit, and EMV.

SUMMARY OF THE INVENTION

In general, in one aspect this invention features a secure mobile phone-point of sale (mobile phone-POS) system for conducting secure PIN entry requiring electronic transactions. The secure mobile phone-POS includes a mobile phone, a secure PED and software and hardware components for processing the secure PIN entry requiring electronic transactions. The secure PED includes a keypad, a screen display and security components effecting the keypad and the screen display to meet certification requirements of a certification institution for conducting the secure PIN entry requiring transactions. The secure PED is integrated with the mobile phone and the system has the functionality of both the mobile phone and the secure PED.

Implementations of this aspect of the invention include the following. The secure mobile phone-POS system has a mobile phone form factor. The mobile phone form factor may be bar type, clamshell, flip or slide. The mobile phone-POS system has a length in the range of 2-8 inches, width in the range of 1.5-3 inches and weight in the range of 5-10 ounces. The mobile phone includes a serial interface port and the secure PED is integrated with the mobile phone via the serial interface port. The mobile phone includes a Printed Circuit Board Assembly (PCBA) and the secure PED is integrated directly with the mobile phone's PCBA. The mobile phone includes a mobile phone PCBA and the secure PED comprises a PED PCBA and the mobile phone PCBA is integrated with the PED PCBA via a connector. The secure PED includes a Printed Circuit Board Assembly (PCBA) and the mobile phone includes a radio communication module integrated directly onto the secure PED's PCBA. The mobile phone further includes an antenna, a speaker, and a microphone, and the antenna, the speaker and the microphone are integrated directly onto the secure PED's PCBA. The mobile phone-POS system further includes a PCBA and the mobile phone and the secure PED are integrated directly onto the mobile phone-POS PCBA. The mobile phone includes a Subscriber Identification Module (SIM) slot and the secure PED is integrated with the mobile phone via the SIM slot. The certification requirements of a certification institution may be the Payment Card Industry (PCI) PED specification, Europay MasterCard Visa (EMV) Level 1 and level 2 standard compliance, Bank Card testing Center of China (BCTC), Zentraler Kreditausschuss (ZKA) and Interac. The security components include a microprocessor, RAM, SAM slot for receiving a SAM module, smart card reader/writer, screen display, keypad, battery, flash memory, erasable memory, and detector switches, serial port, magnetic card reader, hardware id, real time clock, Bluetooth, Infrared port, SIM slot for connecting to the mobile phone or SIM slot for receiving a SIM card. The software components include a secure transaction application and a transaction application commanding protocol (TACP). The hardware components include microprocessor, RAM, SIM slot, SIM card, SAM card, SAM slot, smart card reader/writer, screen display, keypad, battery, flash memory, erasable memory, serial port, magnetic card reader, real time clock, Bluetooth, Infrared port, IrDA and printer. The software and hardware components for processing the secure PIN entry requiring electronic transactions may be included in the secure PED or the mobile phone. The mobile phone may also include a phone screen display and a phone keypad that do not meet certification requirements of a certification institution for conducting the secure PIN entry requiring transactions.

In general in another aspect the invention features a secure mobile phone-POS system for conducting secure PIN entry requiring electronic transactions, including a mobile phone, a secure PED and software and hardware components for processing the secure PIN entry requiring electronic transactions. The mobile phone includes a keypad, a screen display, a Printed Circuit Board Assembly (PCBA) and software and hardware components for processing the secure PIN entry requiring electronic transactions. The secure PED includes security components effecting the keypad and the screen display of the mobile phone to meet certification requirements of a certification institution for conducting the secure PIN entry requiring transactions. The secure PED is integrated directly with the mobile phone's PCBA. The secure mobile phone-POS has the functionality of both the mobile phone and the secure PED and a mobile form factor In general in another aspect the invention features a method for conducting secure PIN entry requiring electronic transactions, comprising the following steps. First providing a mobile phone. Next, providing a secure PED that includes a keypad, a screen display and security components effecting the keypad and the screen display to meet certification requirements of a certification institution for conducting the secure PIN entry requiring transactions. Next, providing software and hardware components for processing the secure PIN entry requiring electronic transactions. Finally, integrating the secure PED with the mobile phone to form one unit.

In general in another aspect the invention features a pin entry device including a keypad, a screen display and security components effecting the keypad and the screen display to meet certification requirements of a certification institution for entering and displaying security sensitive information, respectively. The pin entry device is integrated with a non-secure mobile phone thereby upgrading the mobile phone's non-secure screen display and keypad with the security components.

Among the advantages of this invention may be one or more of the following. The secure PED is a self-sufficient payment enabling module. It is capable of accepting entry and displaying information in a way that satisfies the payment card industry security standards. The secure PED performs electronic payment transactions by interacting with banking cards and payment processors. Depending on the level of integration the secure PED may not have payment processing functionality implemented by the device itself. The secure PED is responsible for the secure PIN entry and display functionality and the mobile phone is responsible for sending the data for processing of the transaction by a host. The secure PED with or without payment processing capability conforms to security standards imposed by the payment industry. These standards are the same standards that are applicable for networked POS (Point Of Sale) Terminals commonly used in the industry.

DETAILED DESCRIPTION OF THE INVENTION

Figure 1:
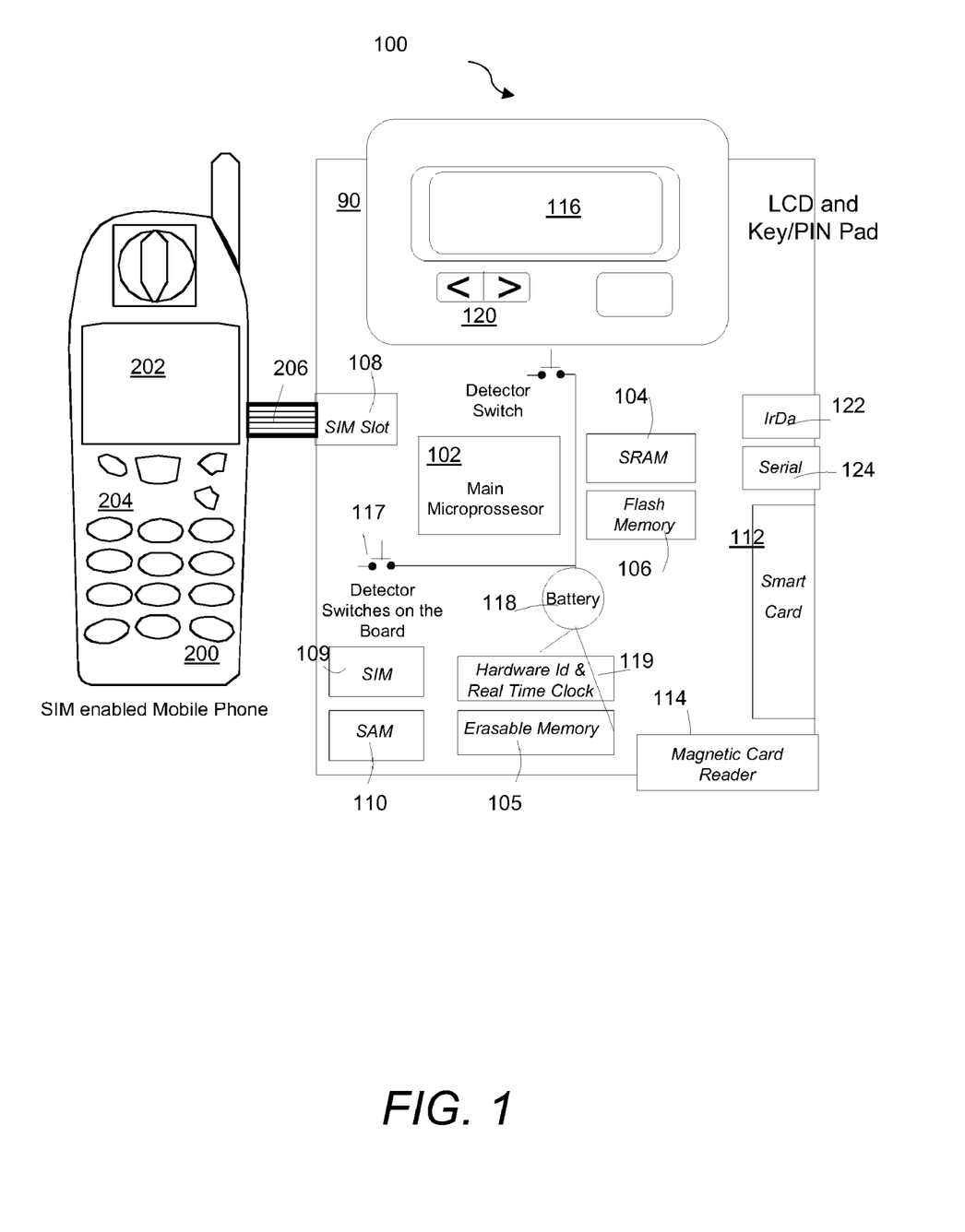
FIG. 1 is a schematic diagram of a dual keypad mobile phone-POS system that includes a secure PED integrated with the mobile phone via a SIM slot.

Referring to FIG. 1, a secure PED 90 includes a main microprocessor 102, Random Access Memory (RAM) 104, erasable memory 105, persistent flash memory 106, a Subscriber Identification Module (SIM) slots 108, 109, Secure Authentication Module (SAM) slot 110, smart card reader/writer 112, magnetic stripe reader 114, Infrared Data Association (IrDA) port 122, Serial port 124, Liquid Crystal Display (LCD) screen 116, keypad 120, life-time battery 118, real time clock 119, and detector switches. The main microprocessor 102 controls all other components of the device and runs all operational environment and application programs. The RAM 104 and the persistent flash memory 106 store program and data. SIM slot 108 provides the ability to connect to the SIM card of a GSM enabled Mobile Phone 200. SIM slot 109 provides the ability to connect another phone SIM card. SAM slot 110 provides the ability to insert a Secure Authentication Module that is used for the authentication purpose of the payment application. The smart card reader/writer 112 and the magnetic stripe reader 114 are used to read and write smart cards and to read magnetic stripe cards, respectively. These type of card interactions are needed for performing payment transactions utilizing banking payment cards. The IrDA 122 and/or the serial port 124 provide the ability to communicate with an external printer or other peripherals. The LCD screen 116 and the key/PIN pad 120 provide the ability to display information on the screen and to input information by pressing keys. The lifetime battery 118 provides power to the components that require independent and permanent power supply such as the real time clock 119 and the erasable memory 105. The erasable memory 105 contains sensitive data that will be automatically erased by removing the power supply. Usually this memory is used to store such highly sensitive data as encryption keys. The detector switches 117 detect any device tampering attempt and effectively cut-off power supply from the erasable memory.

There are several ways of integrating the secure PED 90 to a mobile phone 200. Referring to FIG. 1, the secure PED 90 is integrated with a SIM enabled mobile phone 200 by connecting the phone's SIM card 206 to the SIM slot 108. This integration method preserves all of the secure PED's components that are described above. In this case the integrated mobile phone-POS device has two screens and two keypads. The mobile phone screen 202 and keypad 204 do not have the ability to securely enter and display sensitive information. The secure PED screen 116 and keypad 120 provide the ability to securely enter and display sensitive information. The integration between the mobile phone 200 and the secure PED is done using GSM standard "SIM Card Toolkit" that allows the PED to interact with the phone for the purpose of performing payment transaction.

Figure 2:
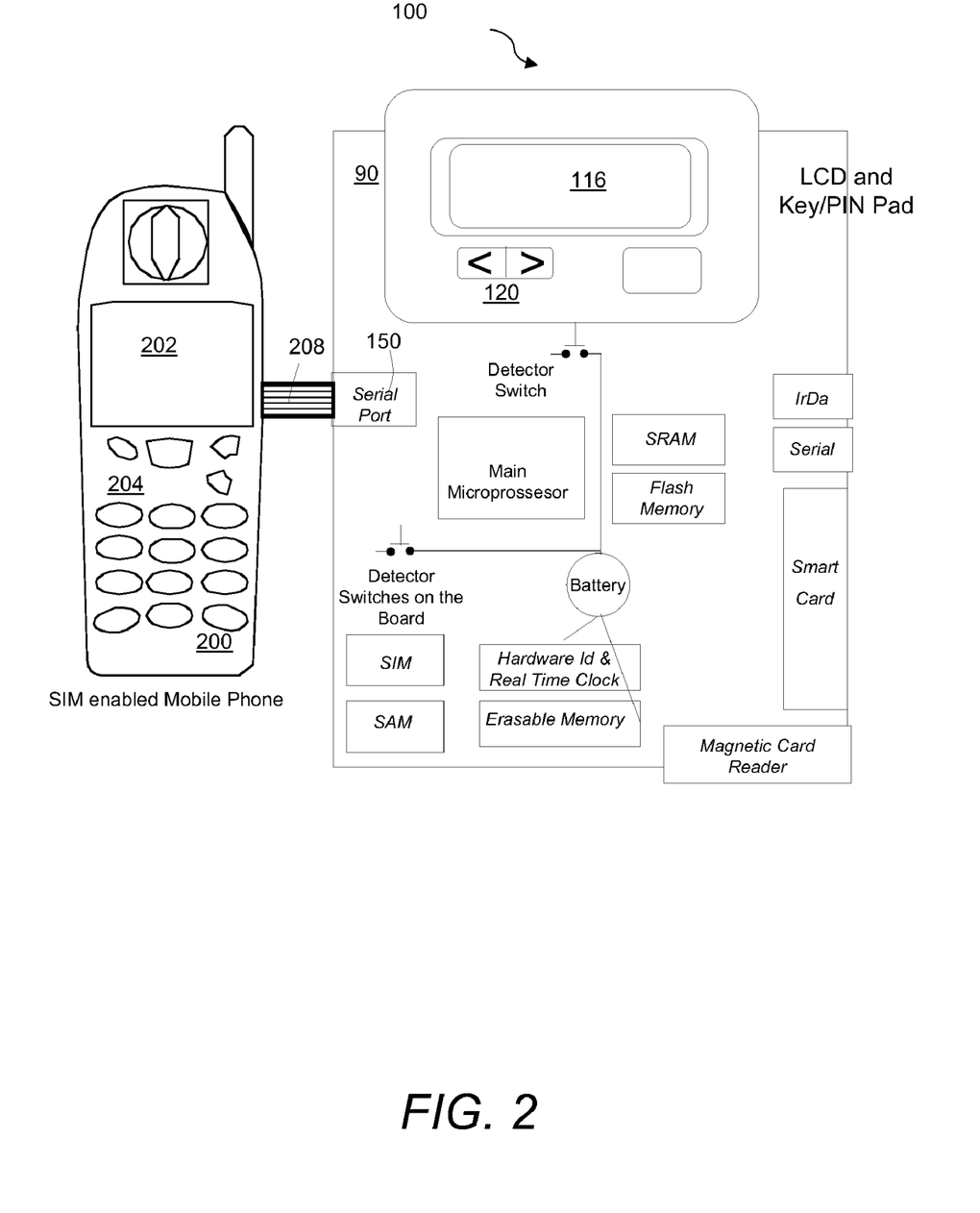
FIG. 2 is a schematic diagram of a dual keypad mobile phone-POS system that includes a secure PED integrated with the mobile phone via a serial port.

Referring to FIG. 2, the PED 90 is integrated with the mobile phone 200 via the serial port 150. This integration method preserves all of the secure PED's components that are described above except of the SIM slot 108. In this case the integrated mobile phone-POS device 100 has two screens and two keypads. One set of screen 202 and a corresponding keypad 204 comes from the mobile phone 200 and this set does not have the ability to securely enter and display sensitive information. The other set of the screen 116 and keypad 120 comes from the PED and this set has the ability to securely enter and display sensitive information. The integration between the mobile phone and the PED is done using mobile phone standard AT-command set that allows the PED to interact with the mobile phone for the purpose of transmitting payment transaction data to and from the transaction processing center.

Figure 3:
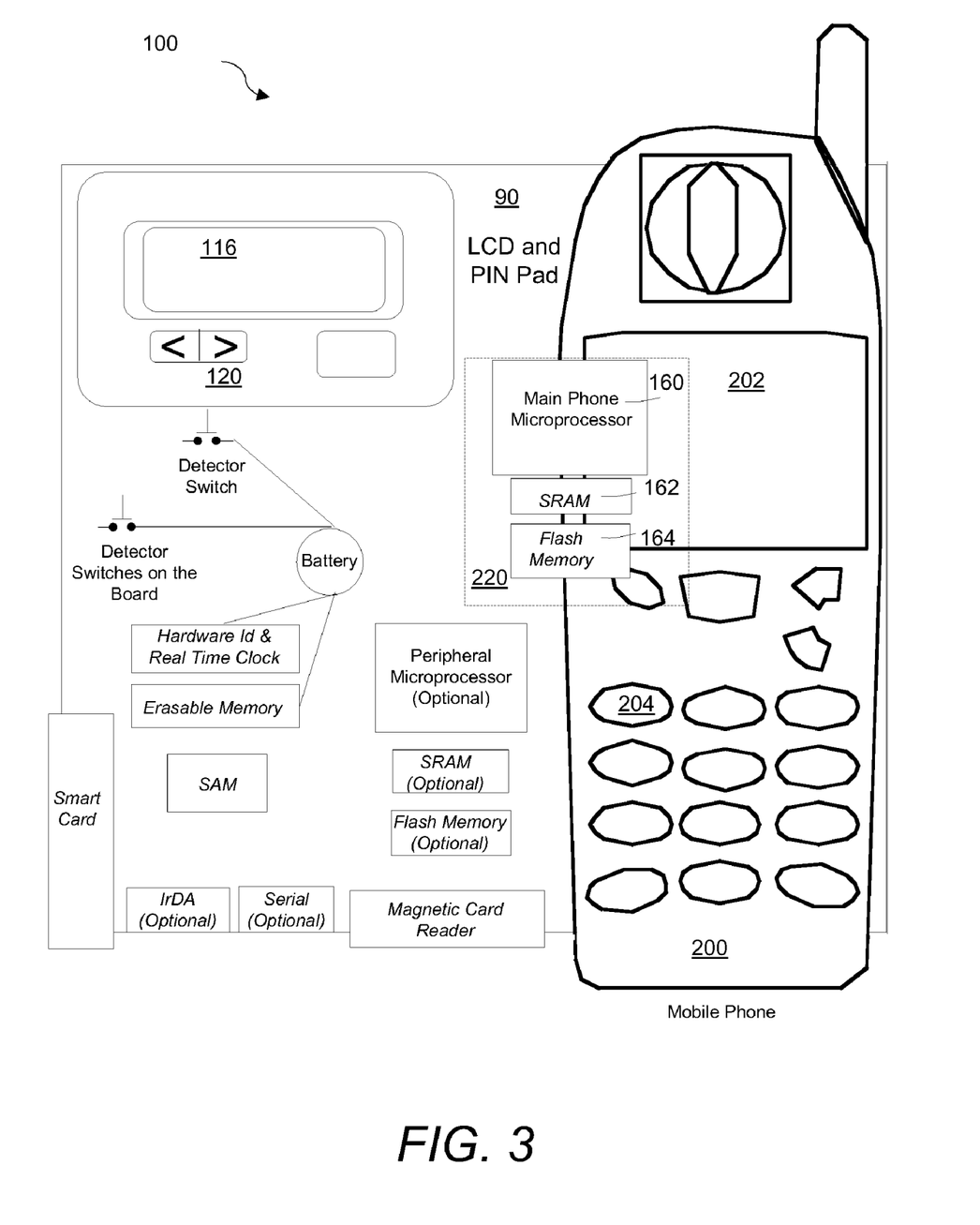
FIG. 3 is a schematic diagram of a dual keypad mobile phone-POS system that includes a secure PED integrated directly with the mobile phone's PCBA.

Referring to FIG. 3, the PED 90 is integrated directly with the mobile phone's PCBA 220. This integration method preserves all of the device components listed above with the exception of the SIM slot 108. In this case the secure PED's components are directly placed in the circuitry of the mobile phone. The mobile phone's circuitry has to be modified to accommodate additional components that provide the PED functionality. The mobile phone's main microprocessor 160 controls all other components of the device and runs all operational environment and application programs. The mobile phone's RAM 162 and persistent flash memory 164 store programs and data. The secure PED's microprocessor 102, RAM 104, flash memory 106, IrDA 122, and serial ports 150 become optional components that may or may not be present in the integrated mobile phone circuitry. Such integration may preserve the secure PED's screen 116 and keypad 120 in the integrated circuitry (shown in FIG. 3) or alternatively may upgrade the mobile phone's screen and pad with the security features from the PED (shown in FIG. 4).

Figure 4:
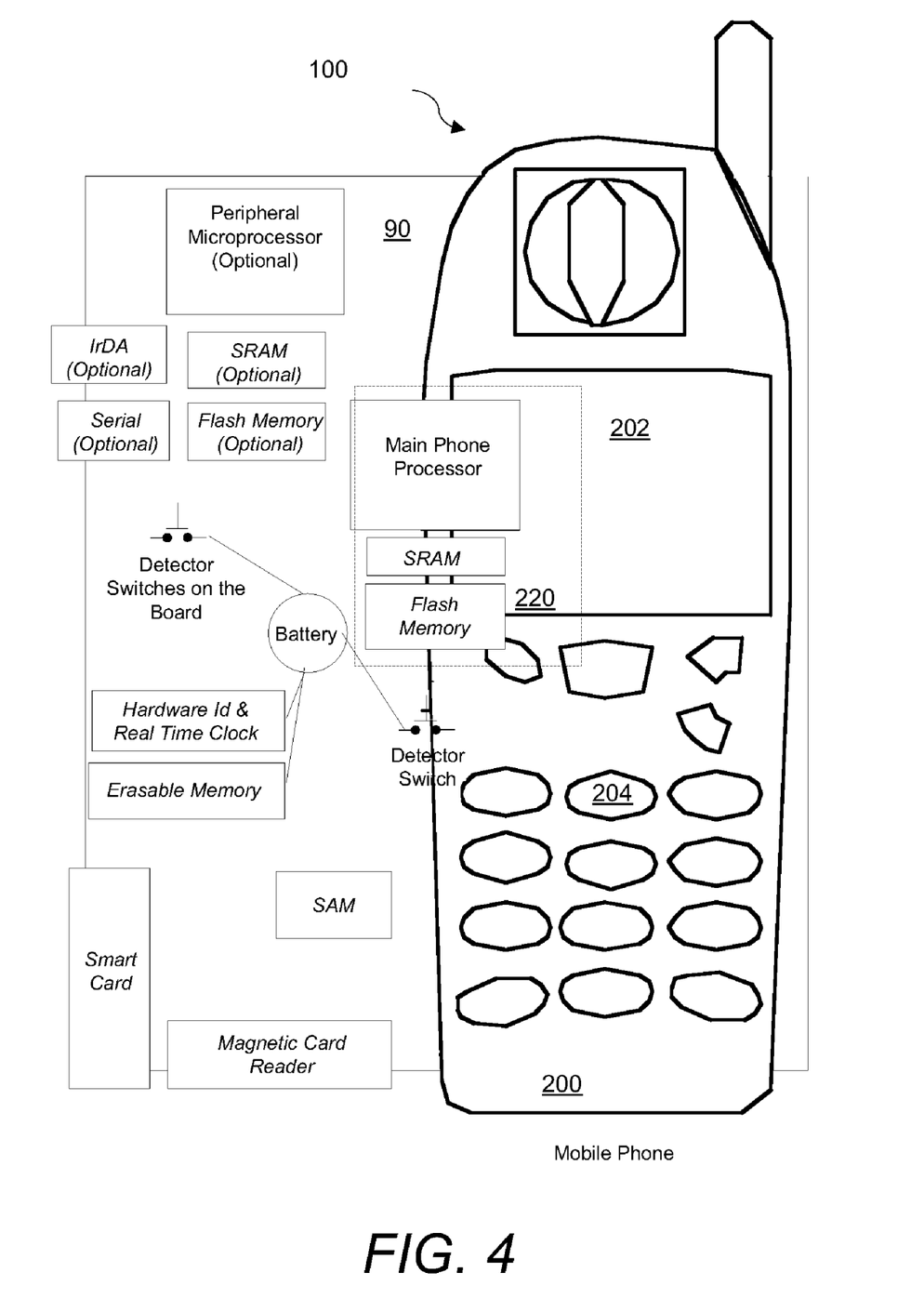
FIG. 4 is a schematic diagram of a single keypad mobile phone-POS system that includes a secure PED integrated directly with the mobile phone's PCBA.

Referring to FIG. 4, the PED 90 is integrated with the mobile phone's PCBA 220. This integration method preserves all of the device components listed above with the exception of the SIM slot 108, LCD screen 116, and key/PIN pad 120. The secure PED's microprocessor 102, RAM 104, flash memory 106, IrDA 122, serial ports 124 become optional components that may or may not present in the integrated mobile phone circuitry. In this case the mobile phone-POS system 100 has only one screen 202 and one keypad 204 that are inherited from the phone 200. This inherited screen 202 and keypad 204 are protected by the security components of the PED device. In this configuration, the mobile phone can be based on traditional mobile phone PCBA by mobile manufacturers, or it can be based on mobile phone module/radio module, which contains mobile phone capabilities integrated with the PED device and processor.

Figure 5:
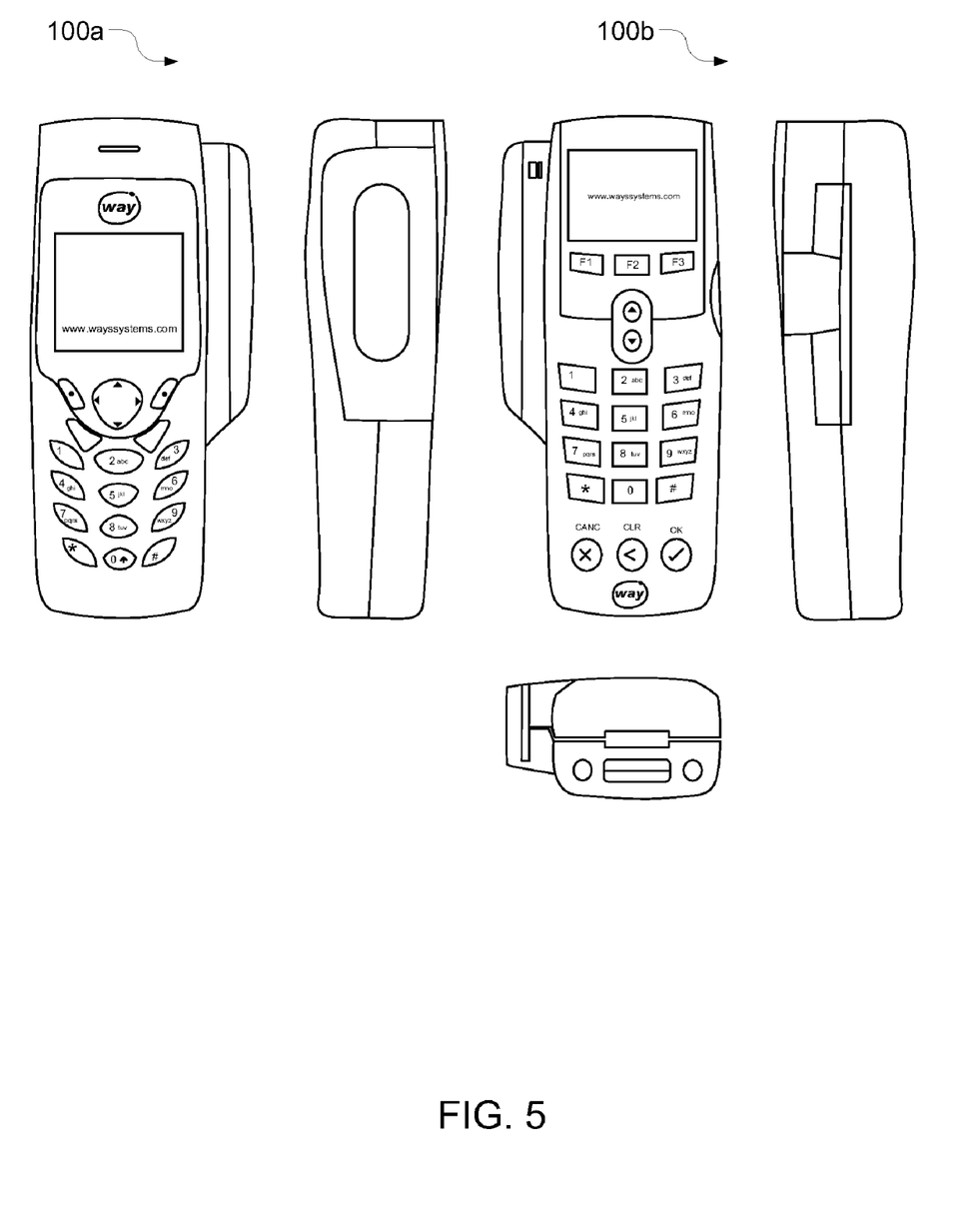
FIG. 5 depicts front, side and top views of two bar type single keypad/display mobile phone-POS systems.
Figure 6:
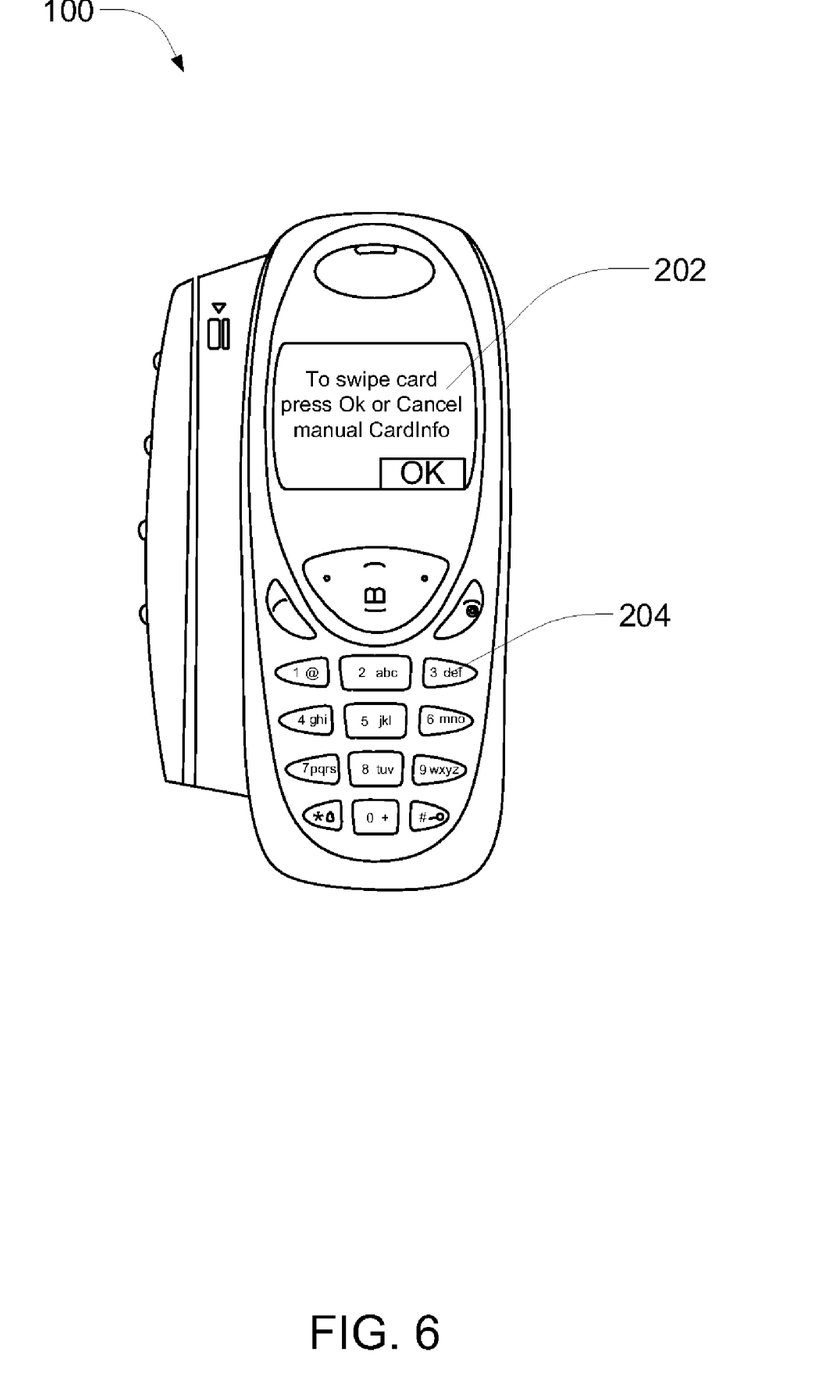
FIG. 6 is a front view of a bar type dual keypad/display mobile phone-POS system.
Figure 7:
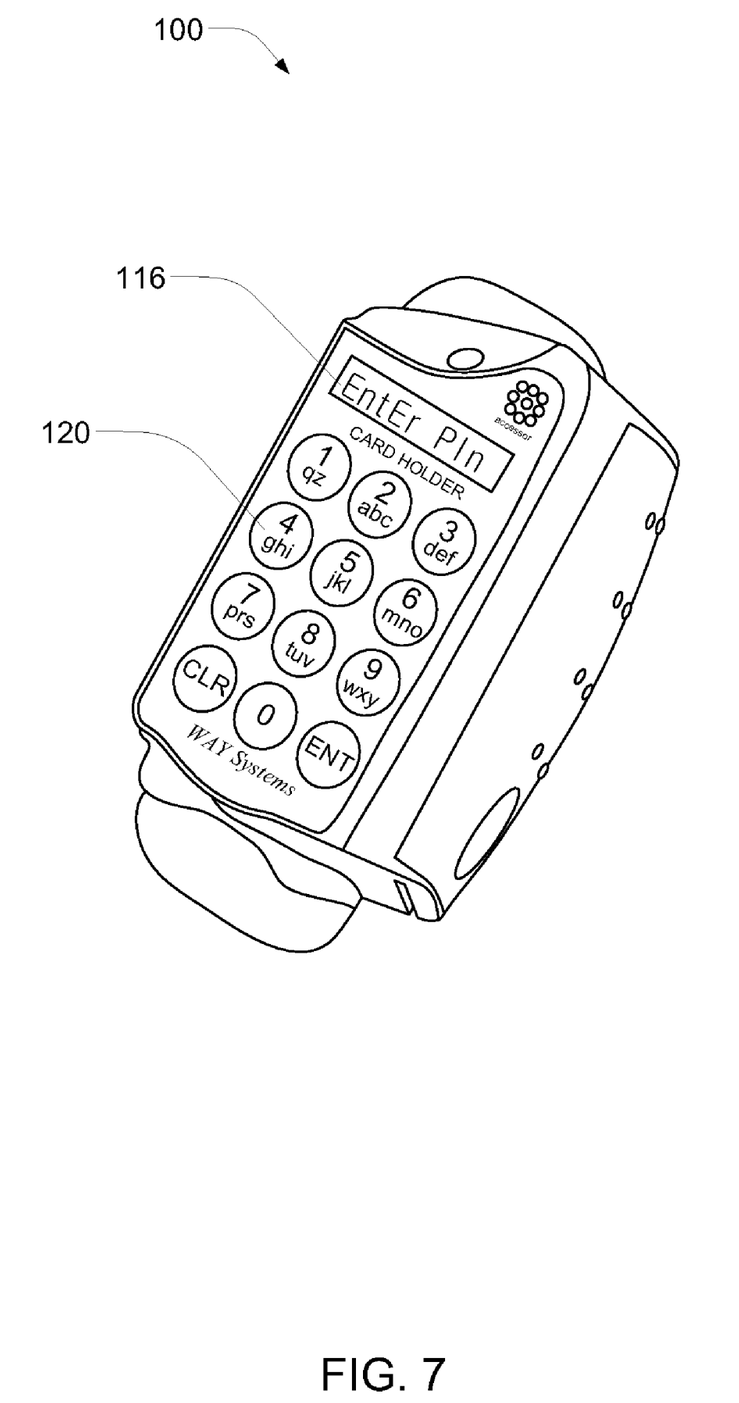
FIG. 7 is a back view of a bar type dual keypad/display mobile phone-POS system.
Figure 8:
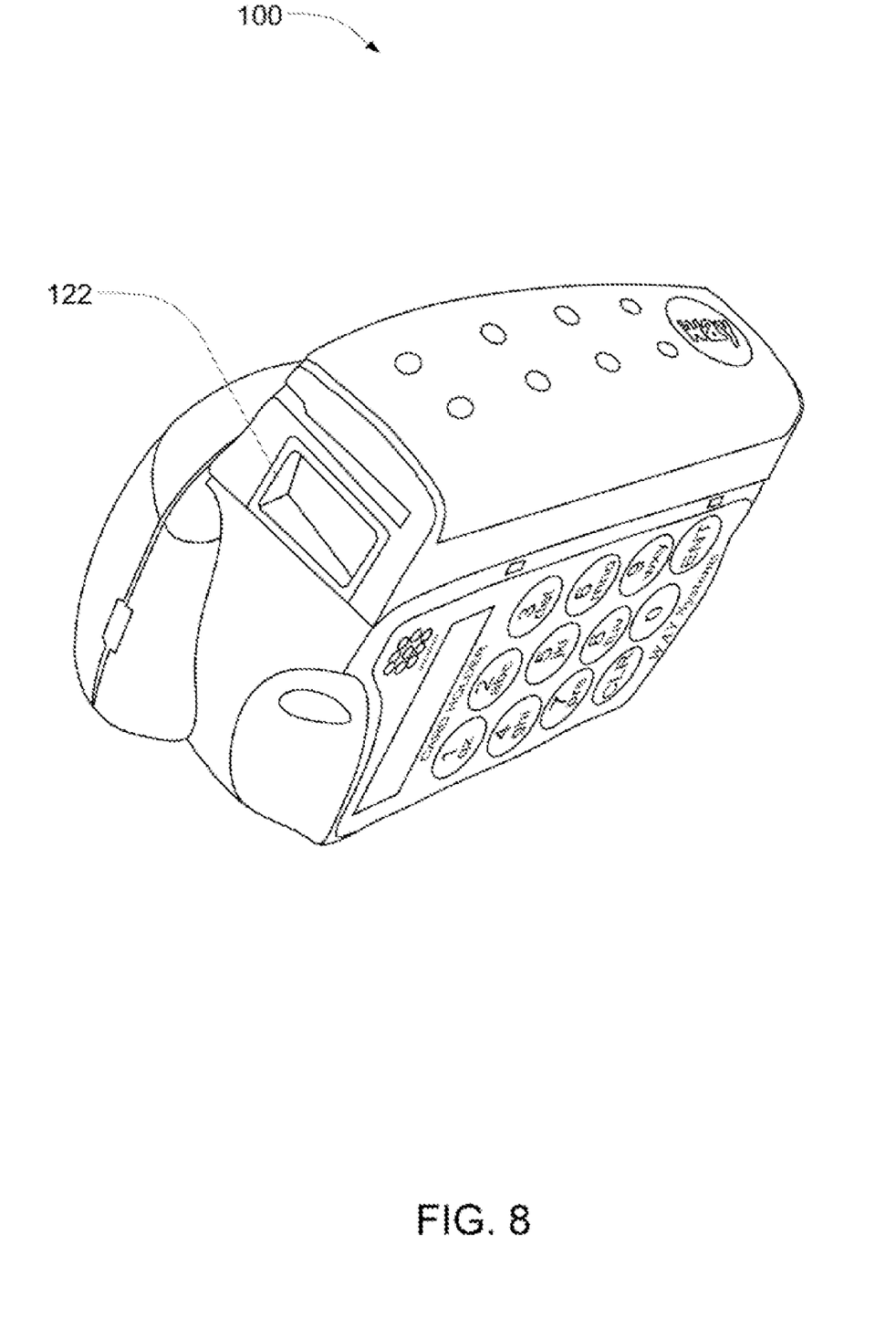
FIG. 8 is a top view of a bar type dual keypad/display mobile phone-POS system.
Figure 9:
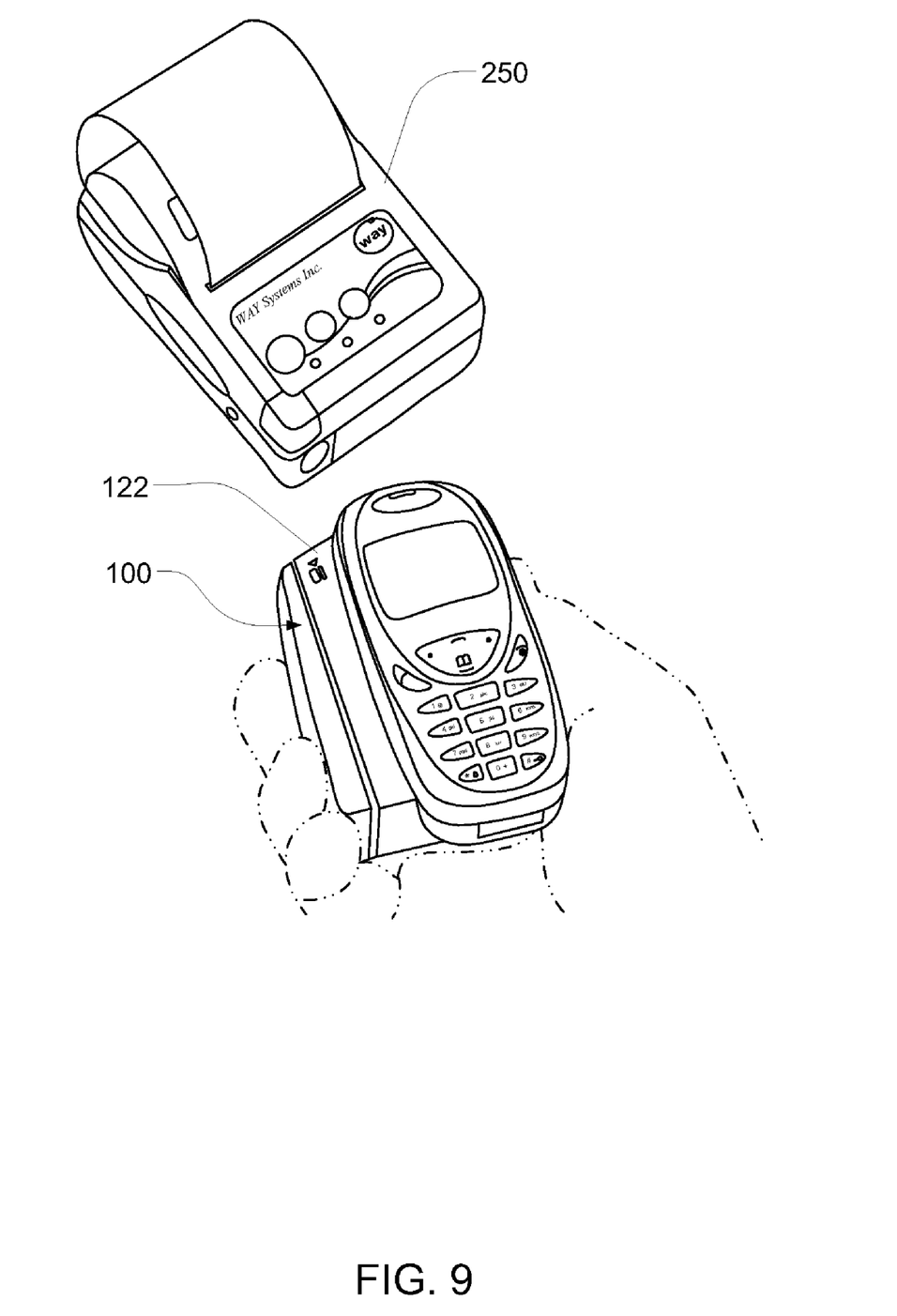
FIG. 9 is a front view of a bar type dual keypad/display mobile phone-POS system connecting remotely to a printer.

Examples of integrated mobile phone-POS systems 100 are shown in FIG. 5-FIG. 9. Referring to FIG. 5, each of the two embodiments 100a, 110b of single keypad/display mobile phone-POS systems includes a keypad and a display and has the form factor of a bar type mobile phone. They have the functionality of a regular mobile phone, i.e., they perform phone calls in a mobile environment and they are certified and function as secure PEDs. Typical dimensions of these integrated mobile phone-POS systems are in the range of 2-8 inches length and 1.5-3 inches width. The weight of these devices is in the range of 5-10 ounces. Referring to FIG. 6 the dual keypad/display mobile phone-POS device 100 includes a first keypad 204 and a first display 202 on the front side of the mobile phone-POS device. The mobile phone-POS device 100 of FIG. 6 also includes a second keypad 120 and a second display 116 on the back side of the mobile phone-POS device, as shown in FIG. 7. The mobile phone-POS device 100 of FIG. 6 also includes an IrDA port 122, shown in FIG. 8, for connecting to an external printer 250, shown in FIG. 9. Other types of mobile phone form factors include the clamshell, the flip and the slide. All of these forms allow one to put the mobile phone up to his ear to listen and at the same time close to his mouth to talk.

The integrated mobile phone-POS system 100 includes all the hardware components and software components that are required to process electronic payment transactions for banking cards. In one example these software components include a secure transaction application and a transaction application commanding protocol (TACP), described in U.S. patent application Ser. No. 11/226,823, filed on Sep. 14, 2005, and entitled "SYSTEM AND METHOD FOR A SECURE TRANSACTION MODULE" the contents of which are expressly incorporated herein by reference. Only external power supply and communication channel are needed to successfully authorize transaction with the card issuing institution. Depending on the level of integration the PED may not have payment processing functionality implemented by the device itself. In such cases payment processing functionality may be performed by the mobile phone. However, the PED is still responsible for the secure PIN entry and display functionality. The PED with or without payment processing capability conforms to security standards imposed by the payment industry.

The secure PED of this invention is certified by international and national authorities and institutions. All hardware and software components of the secure PED as well as the PCBA circuitry and packaging are implemented in accordance with the standards that are required for certification. Certification has been obtained by Payment Card Industry (PCI), Europay MasterCard VISA (EMV) and Bank Card Testing Center of China (BCTC) according to PCI PIN Entry Device specification, Europay MasterCard VISA Level 1 and Level 2 standard compliance (EMV Smart Card processing compliance), and BCTC specification, respectively. Certification has also been obtained by the Zentraler Kreditausschuss (ZKA) and Interac Several embodiments of the present invention have been described. Nevertheless, it will be understood that various modifications may be made without departing from the spirit and scope of the invention. Accordingly, other embodiments are within the scope of the following claims.

What is claimed is:

1. A secure mobile phone-point of sale (mobile phone-POS) system for conducting secure Personal Identification Number (PIN) entry requiring electronic transactions, comprising:
    a mobile phone;
    a non-virtual secure PIN Entry Device (PED) comprising a keypad, a screen display and hardware security components effecting said keypad and said screen display to meet certification requirements of a certification institution for conducting said secure PIN entry requiring transactions;
    (software and hardware components for processing said secure PIN entry requiring electronic transactions;
    wherein said secure PED is integrated with said mobile phone; and
    wherein said mobile phone-POS system comprises functionality of both said mobile phone and said secure PED.

2. The system of claim 1 wherein said mobile phone-POS system comprises a mobile phone form factor of bar type, clamshell, flip or slide.

3. The system of claim 2 wherein said mobile phone-POS system has a length in the range of 2-8 inches, width in the range of 1.5-3 inches and weight in the range of 5-10 ounces.

4. The system of claim 1 wherein said mobile phone comprises a serial interface port and said secure PED is integrated with said mobile phone via said serial interface port.

5. The system of claim 1 wherein said mobile phone comprises a Printed Circuit Board Assembly (PCBA) and said secure PED is integrated directly with said mobile phone's PCBA.

6. The system of claim 1 wherein said mobile phone comprises a mobile phone PCBA and said secure PED comprises a PED PCBA and said mobile phone PCBA is integrated with said PED PCBA via a connector.

7. The system of claim 1 wherein said secure PED comprises a Printed Circuit Board Assembly (PCBA) and said mobile phone comprises a radio communication module integrated directly onto said secure PED's PCBA.

8. The system of claim 7 wherein said mobile phone further comprises an antenna, a speaker, and a microphone, and said antenna, said speaker and said microphone are integrated directly onto said secure PED's PCBA.

9. The system of claim 1 further comprising a PCBA and said mobile phone and said secure PED are integrated directly onto said PCBA.

10. The system of claim 1 wherein said mobile phone comprises a Subscriber Identification Module (SIM) slot and said secure PED is integrated with said mobile phone via said SIM slot.

11. The system of claim 1 wherein said certification requirements of a certification institution are selected from a group consisting of Payment Card Industry (PCI) PED specification, Europay MasterCard Visa (EMV) Level 1 and level 2 standard compliance, Bank Card testing Center of China (BCTC), Zentraler Kreditausschuss (ZKA) and Interac.

12. The system of claim I wherein said hardware security components are selected from a group consisting of microprocessor, RAM, SIM slot for connecting to the said mobile phone, SIM slot for receiving a SIM card, SAM slot for receiving a SAM module, smart card reader/writer, screen display, keypad, battery, flash memory, erasable memory, tamper detector switches, serial port, magnetic card reader, hardware id, real time clock, Bluetooth and Infrared port.

13. The system of claim 1 wherein said software components comprise a secure transaction application and a transaction application commanding protocol (TACP).

14. The system of claim 1 wherein said hardware components comprise microprocessor, RAM, SIM slot, SIM card, SAM card, SAM slot, smart card reader/writer, screen display, keypad, battery, flash memory, erasable memory, serial port, magnetic card reader, real time clock, Bluetooth, Infrared port, IrDA and printer.

15. The system of claim 1 wherein said secure PED comprises said software and hardware components for processing said secure PIN entry requiring electronic transactions.

16. The system of claim 1 wherein said mobile phone comprises said software and hardware components for processing said secure PIN entry requiring electronic transactions.

17. A secure mobile phone-point of sale (mobile phone-POS) system for conducting secure Personal identification Number (PIN) entry requiring electronic transactions, comprising:
a mobile phone, wherein said mobile phone comprises a phone screen display and a phone keypad and said phone screen display and phone keypad do not meet certification requirements of a certification institution for conducting said secure PIN entry requiring transactions;
a non-virtual secure PIN Entry Device (PED) comprising a keypad, a screen display and hardware security components effecting said keypad and said screen display to meet certification requirements of a certification institution for conducting said secure PIN entry requiring transactions;
software and hardware components for processing said secure PIN entry requiring electronic transactions;
wherein said secure PED is integrated with said mobile phone; and
wherein said mobile phone-POS system comprises functionality of both said mobile phone and said secure PED.

18. A secure mobile phone-POS system for conducting secure PIN entry requiring electronic transactions, comprising:
a mobile phone comprising a keypad, a screen display, a Printed Circuit Board Assembly (PCBA), software and hardware components for processing said secure PIN entry requiring electronic transactions;
a non-virtual secure PED comprising hardware security components effecting said keypad and said screen display to meet certification requirements of a certification institution for conducting said secure PIN entry requiring transactions;
wherein said secure PED is integrated directly with said mobile phone's PCBA; and
wherein said mobile phone-POS comprises functionality of both said mobile phone and said secure PED and a mobile form factor.

19. A method for conducting secure PIN entry requiring electronic transactions, comprising:
providing a mobile phone;
providing a non-virtual secure PED comprising a keypad, a screen display and hardware security components effecting said keypad and said screen display to meet certification requirements of a certification institution for conducting said secure PIN entry requiring transactions;
providing software and hardware components for processing said secure PIN entry requiring electronic transactions; and
integrating said secure PED with said mobile phone thereby forming a secure mobile phone-POS system; and
wherein said secure mobile phone-POS system comprises functionality of both said mobile phone and said secure PED and a mobile form factor.

20. The method of claim 19 wherein said mobile phone comprises a serial interface port and said secure PED is integrated with said mobile phone via said serial interface port.

21. The method of claim 19 wherein said mobile phone comprises a Printed Circuit Board Assembly (PCBA) and said secure PED is integrated directly with said mobile phone's PCBA.

22. The method of claim 19 wherein said mobile phone comprises a mobile phone PCBA and said secure PED comprises a PED PCBA and said mobile phone PCBA is integrated with said PED PCBA via a connector.

23. The method of claim 19 wherein said secure PED comprises a Printed Circuit Board Assembly (PCBA) and said mobile phone comprises a radio communication module integrated directly onto said secure PED's PCBA.

24. The method of claim 23 wherein said mobile phone further comprises an antenna, a speaker, and a microphone, and said antenna, said speaker and said microphone are integrated directly onto said secure PED's PCBA.

25. The method of claim 19 further comprising a PCBA and said mobile phone and said secure PED are integrated directly onto said mobile phone-POS PCBA.

26. The method of claim 19 wherein said mobile phone comprises a Subscriber Identification Module (SIM) slot and said secure PED is integrated with said mobile phone via said SIM slot.

27. The method of claim 19 wherein said certification requirements of a certification institution are selected from a group consisting of PCI PED specification, Europay MasterCard Visa (EMV) Level 1 and level 2 standard compliance, Bank Card testing Center of China (BCTC), ZKA and Interac.

28. The method of claim 19 wherein said hardware security components are selected from a group consisting of microprocessor, RAM, SIM slot for connecting to the said mobile phone, SIM slot for receiving a SIM card, SAM slot for receiving a SAM module, smart card reader/writer, screen display, keypad, battery, flash memory, erasable memory, tamper detector switches, serial port, magnetic card reader, hardware id, real time clock, Bluetooth and Infrared port.

29. The method of claim 19 wherein said software components comprise a secure transaction application and a transaction application commanding protocol (TACP).

30. The method of claim 19 wherein said hardware components comprise microprocessor, RAM, SIM slot, SIM card, SAM card, SAM slot, smart card reader/writer, screen display, keypad, battery, flash memory, erasable memory, serial port, magnetic card reader, real time clock, Bluetooth, Infrared port, IrDA and printer.

31. The method of claim 19 wherein said secure PED comprises said software and hardware components for processing said secure PIN entry requiring electronic transactions.

32. The method of claim 19 wherein said mobile phone comprises said software and hardware components for processing said secure PIN entry requiring electronic transactions.

33. A method for conducting secure PIN entry requiring electronic transactions, comprising:

providing a mobile phone, wherein said mobile phone comprises a phone screen display and a phone keypad and said phone screen display and phone keypad do not meet certification requirements of a certification institution for conducting said secure PIN entry requiring transactions;

providing a non-virtual secure PED comprising a keypad, a screen display and hardware security components effecting said keypad and said screen display to meet certification requirements of a certification institution for conducting said secure PIN entry requiring transactions;

providing software and hardware components for processing said secure PIN entry requiring electronic transactions; and integrating said secure PED with said mobile phone thereby forming a secure mobile phone-POS system; and wherein said secure mobile phone-POS system comprises functionality of both said mobile phone and said secure PED and a mobile form factor.

34. A non-virtual pin entry device comprising:

a keypad;

a screen display;

hardware security components effecting said keypad and said screen display to meet certification requirements of a certification institution for entering and displaying security sensitive information, respectively; and wherein said pin entry device is integrated with a non-secure mobile phone thereby upgrading said mobile phone with said security components.

* * * * *